(12) United States Patent
Hayashida et al.

(10) Patent No.: US 7,877,894 B2
(45) Date of Patent: Feb. 1, 2011

(54) DIGITAL DISPLACEMENT MEASURING INSTRUMENT

(75) Inventors: Shuji Hayashida, Kawasaki (JP); Nobuyuki Hayashi, Kawasaki (JP); Shozaburo Tsuji, Kawasaki (JP); Yasuhiro Tsujimoto, Kawasaki (JP); Masahiko Tachikake, Kure (JP); Yuji Fujikawa, Kure (JP); Takashi Komori, Kure (JP); Junji Masui, Kure (JP)

(73) Assignee: Mitutoyo Corporation, Kawasaki-shi (JP)

(*) Notice: Subject to any disclaimer, the term of this patent is extended or adjusted under 35 U.S.C. 154(b) by 8 days.

(21) Appl. No.: 12/511,735

(22) Filed: Jul. 29, 2009

(65) Prior Publication Data

US 2010/0024237 A1 Feb. 4, 2010

(30) Foreign Application Priority Data

Jul. 29, 2008 (JP) .............................. 2008-194892

(51) Int. Cl.
*G01B 3/18* (2006.01)
(52) U.S. Cl. ......................................... 33/831; 33/813
(58) Field of Classification Search ............ 33/813–831
See application file for complete search history.

(56) References Cited

U.S. PATENT DOCUMENTS

| | | | |
|---|---|---|---|
| 3,686,766 A * | 8/1972 | Matumoto | .................. 33/819 |
| 7,321,231 B2 * | 1/2008 | Hayashida et al. | ............ 33/813 |
| 2003/0121169 A1 * | 7/2003 | Hayashida et al. | ............ 33/813 |
| 2005/0172508 A1 | 8/2005 | Seibold | |
| 2008/0250665 A1 * | 10/2008 | Hayashida et al. | ............ 33/825 |
| 2009/0031578 A1 * | 2/2009 | Suzuki et al. | .................. 33/820 |
| 2009/0282689 A1 * | 11/2009 | Hayashida et al. | ............ 33/819 |

FOREIGN PATENT DOCUMENTS

| | | |
|---|---|---|
| EP | 1486753 A2 | 12/2004 |
| EP | 1950524 A1 | 7/2008 |
| JP | 2003-202201 | 7/2003 |
| JP | 2005-003441 | 1/2005 |

* cited by examiner

*Primary Examiner*—G. Bradley Bennett
(74) *Attorney, Agent, or Firm*—Rankin, Hill & Clark LLP

(57) ABSTRACT

A digital displacement measuring instrument includes a spindle screwed into a body to be axially advanced and retracted relative to the body; and an encoder that detects a displacement of the spindle. The encoder includes a rotor and a stator. The rotor is supported by a rotor bushing. The rotor bushing includes an engaging key engageable with a key groove axially provided on the outer circumference of the spindle, and is displaceable in the axial direction of the spindle via a position adjusting screw. The stator is fixed to the body via a stator bushing in the vicinity of the spindle so as not to be displaceable in the axial direction of the spindle.

7 Claims, 6 Drawing Sheets

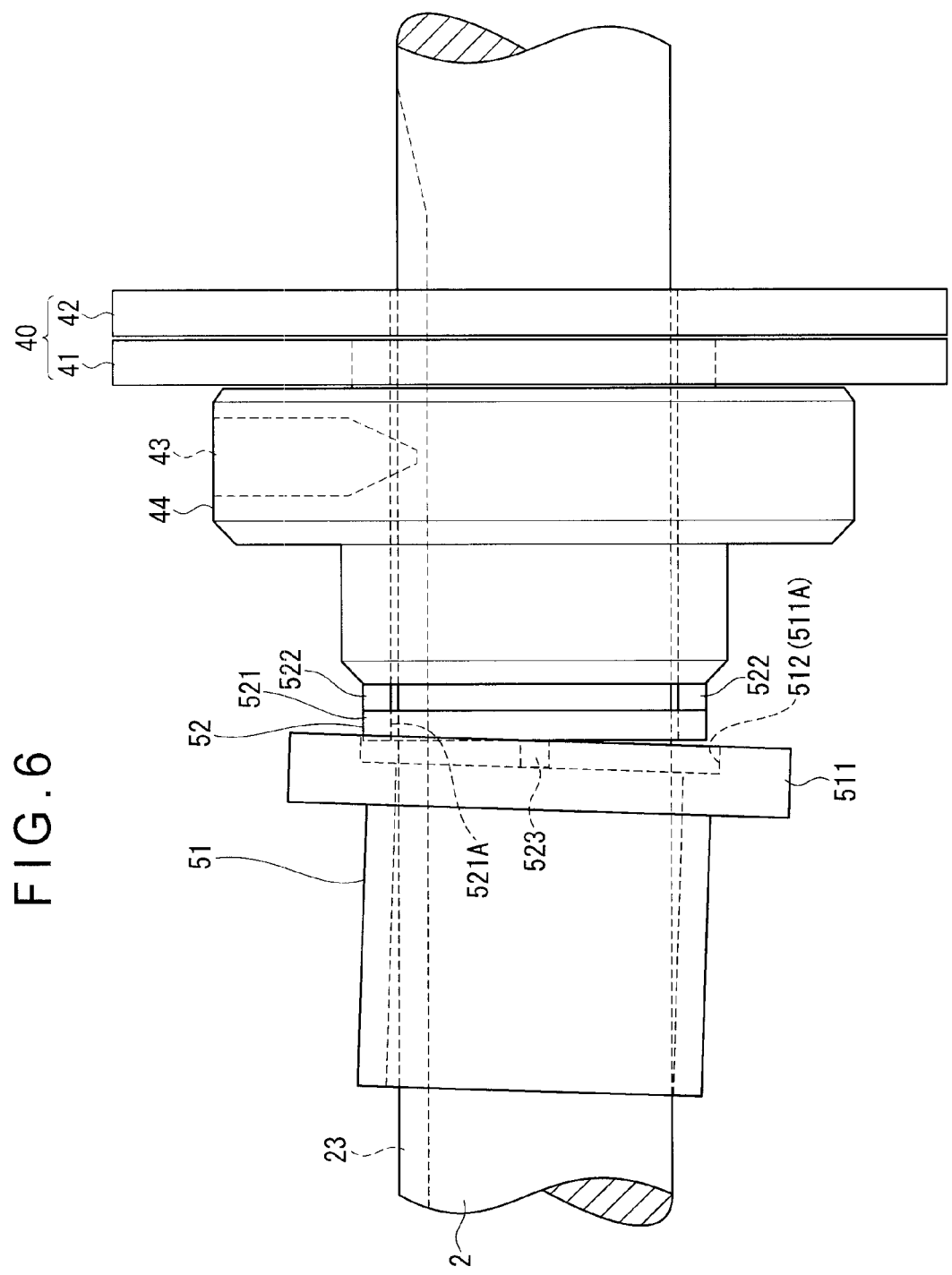

DIGITAL DISPLACEMENT MEASURING INSTRUMENT

The entire disclosure of Japanese Patent Application No. 2008-194892, filed Jul. 29, 2008, is expressly incorporated by reference herein.

BACKGROUND OF THE INVENTION

1. Field of the Invention

The present invention relates to a digital displacement measuring instrument for measuring a dimension of an object to be measured based on an axial displacement of a spindle.

2. Description of Related Art

A digital micrometer using a feed screw has been known as one of digital displacement measuring instruments.

The digital micrometer includes a body, a spindle screwed into the body to be axially advanced and retracted, an encoder for detecting a displacement of the spindle, and a display for digitally displaying the displacement of the spindle based on a detected value of the encoder.

The encoder includes a stator provided on the body, and a rotor rotatable synchronously with the spindle and opposite to the stator by a slight gap. The displacement of the spindle relative to the body is detected as a rotation angle of the rotor relative to the stator.

For example, in an encoder as disclosed in Document 1 (JP-A-2005-3441), a rotor is supported by a rotor bushing that is axially movable relative to a spindle. The rotor bushing includes an engaging pin engaged with a key groove axially provided on the outer circumference of the spindle and restrains the movement of the spindle toward its inner end (an anvil) by an adjusting screw opposite to a stator of a body.

The stator is supported by a stator bushing that is axially movable and is fitted to the outer circumference of an inner cylinder provided on the body and rotatably supporting the spindle. The stator bushing is biased toward the rotor bushing by a spring. While the stator is biased toward the rotor and the stator bushing faces the rotor bushing, the stator and rotor are opposite each other by a slight gap so as to detect a rotation angle of the rotor relative to the stator.

In recent years, it has been increasingly desired to enhance accuracy and efficiency of the digital micrometer.

Thus, a lead of a screw of a spindle to be screwed into a body is typically 0.5 mm or 0.65 mm to meet a standardized accuracy criteria. In order to enhance efficiency in measurement, it is effective to enlarge the lead of the screw of the spindle. Accordingly, an encoder is required to enhance resolution in proportion to the size of the lead of the screw. However, significant measurement errors may be caused depending on the degree of assembly accuracy required for providing the encoder and the movement of the encoder when the accuracy of the digital micrometer is enhanced by enhancing resolution of the encoder. Thus, it has been difficult to provide a digital micrometer having a lead of 1 mm or more.

In the encoder disclosed in Document 1, the stator is biased toward the rotor by the spring. Accordingly, when the rotor is rotated synchronically with the spindle relative to the stator, the stator may axially fluctuate slightly against the spring or incline to the spindle depending on the degree of accuracy of a surface between the stator bushing and rotor bushing that respectively hold the stator and rotor. Then, when the encoder has higher resolution to enhance the accuracy and efficiency, the movement of the stator is detected by the encoder having higher accuracy, which easily results in measurement errors.

SUMMARY OF THE INVENTION

An object of the invention is to provide a digital displacement measuring instrument having high accuracy and efficiency.

A digital displacement measuring instrument according to an aspect of the invention includes: a body; a spindle screwed into the body to be axially advanced and retracted; and an encoder that detects a displacement of the spindle, in which the encoder includes a rotor rotating in a circumferential direction of the spindle and a stator disposed opposite to the rotor with an interposition of a predetermined gap and provided on the body, the rotor is supported by a rotor holder fitted to an outer circumference of the spindle to be displaceable in an axial direction of the spindle, the rotor being disposed opposite to the stator with the interposition of the predetermined gap, the rotor holder includes an engaging key engageable with a key groove axially provided on the outer circumference of the spindle and is displaceable in the axial direction of the spindle by a position adjusting screw, the position adjusting screw covers the outer circumference of the spindle opposite to the stator across the rotor holder and is screwed into the body to be displaceable in the axial direction of the spindle, and the stator is fixed to the body via a stator holder in a vicinity of the spindle so as not to be displaceable in the axial direction of the spindle.

According to the above arrangement, when the spindle is rotated for measurement, the spindle is advanced and retracted by the rotation of the spindle. Then, the displacement of the spindle is detected by the encoder, thereby measuring a dimension of an object based on the displacement of the spindle.

In the encoder according to the aspect of the invention, the stator is fixed to the body via the stator holder in the vicinity of the spindle so as not to be displaceable in the axial direction of the spindle. Accordingly, even when the rotor holder and rotor are rotated synchronically with the spindle, measurement errors due to the movement of the stator can be avoided as much as possible.

Thus, even when the encoder has high resolution for enhancing accuracy and efficiency, the movement of the stator is not detected by the encoder having high accuracy, thus providing a digital displacement measuring instrument having high accuracy and efficiency.

In the digital displacement measuring instrument according to the aspect of the invention, it is preferable that a screw portion of the spindle screwed into the body has a lead of 1 mm or more.

Since the screw portion of the spindle has the lead of 1 mm or more according to the above arrangement, operability can be enhanced as compared to, for example, a traditional digital micrometer having a lead of 0.5 mm. Thus, the efficiency can be enhanced.

In the digital displacement measuring instrument according to the aspect of the invention, it is preferable that the stator holder includes a stator holding portion that holds the stator on a first end and a fitted portion on a second end, the fitted portion being fitted to an outer circumference of a spindle support cylinder that is provided on the body and rotatably supports the outer circumference of the spindle, and the fitted portion is fixed to the spindle support cylinder.

According to the above arrangement, the stator holder includes the stator holding portion for holding the stator on the first end and the fitted portion fitted to the outer circumference of the spindle support cylinder that is provided on the body and rotatably supports the outer circumference of the spindle on the second end. Accordingly, only by fitting the fitted portion to the outer circumference of the spindle support cylinder and then fixing the fitted portion to the spindle support cylinder via a setscrew or the like, the stator can be fixed to the body to be accurately centered on the spindle. Thus, the digital displacement measuring instrument can be easily assembled while maintaining high accuracy.

In the digital display displacement measuring instrument according to the aspect of the invention, it is preferable that an orientation maintaining unit is provided between the rotor holder and the position adjusting screw to contact both the rotor holder and the position adjusting screw to maintain an orientation of the rotor holder to be substantially orthogonal to an axis of the spindle.

Since the orientation maintaining unit is provided between the rotor holder and position adjusting screw according to the above arrangement, the orientation of the rotor holder can be maintained by the orientation maintaining unit contacting both of the rotor holder and position adjusting screw so that the rotor holder is substantially orthogonal to the axis of the spindle.

Thus, even when the rotor (rotor holder) is rotated relative to the stator synchronically with the spindle, the movement of the rotor during its rotation (inclination to the axis of the spindle) can be absorbed, thereby enhancing the accuracy. Also, for example, even when the position adjusting screw is inclined relative to the spindle, the rotor holder is not inclined to the spindle and an appropriate orientation of the rotor holder can be maintained. Thus, the depth of the engaging key relative to the key groove is hardly varied by the rotation of the spindle, thereby reducing rotational transmission errors.

In the displacement measuring instrument according to the aspect of the invention, it is preferable that the orientation maintaining unit includes: a board provided on the outer circumference of the spindle; two first abutment portions provided on a first end surface of the board to contact the position adjusting screw; and two second abutment portions provided on a second end surface of the board to contact the rotor holder, the first abutment portions are symmetric about the axis of the spindle, the second abutment portions are symmetric about the axis of the spindle, and a line connecting the two first abutment portions is substantially perpendicular to a line connecting the two second abutment portions.

According to the above arrangement, the two first abutment portions of the board are symmetric about the axis of the spindle and the two second abutment portions are symmetric about the axis of the spindle. Further, the line connecting the two first abutment portions is substantially perpendicular to the line connecting the two second abutment portions. Thus, the orientation of the rotor holder can be maintained to be substantially orthogonal to the axis of the spindle.

Thus, the movement of the rotor during its rotation (inclination to the axis of the spindle) is absorbed to enhance the accuracy. Further, even when the position adjusting screw is inclined to the spindle, the rotor holder is not inclined to the spindle and an appropriate orientation of the rotor holder is maintained. Thus, rotational transmission errors can be reduced.

In the digital displacement measuring instrument according to the aspect of the invention, it is preferable that the position adjusting screw includes a board restricting portion to restrict the board from moving in a direction perpendicular to the axis of the spindle, and the board restricting portion is provided on an end surface of the position adjusting screw adjacent to the rotor holder and includes a recess to accommodate the board.

According to the above arrangement, the orientation maintaining unit can be restricted from moving in the direction perpendicular to the axis of the spindle of the board by adding the recess capable of accommodating the board of the orientation maintaining unit on the end surface of the position adjusting screw adjacent to the rotor holder provided on a traditional digital displacement measuring instrument. Accordingly, the movable range of the board of the orientation maintaining unit can be limited. Thus, the orientation maintaining unit does not contact the spindle and therefore does not prevent smooth rotation of the spindle.

In the digital displacement measuring instrument according to the aspect of the invention, it is preferable that the spindle is screwed into the body via a sleeve and a thimble fitted to an outer circumference of the sleeve is fixed to the spindle. It is further preferable that the digital displacement measuring instrument further includes: an operation sleeve rotatable relative to the spindle and including a first operation section provided to an outer end of the spindle and having a smaller diameter than a diameter of the sleeve and a second operation section fitted to an outer circumference of the thimble; and a constant-pressure mechanism provided either between the first operation section of the operation sleeve and the outer end of the spindle or between the second operation section of the operation sleeve and the outer circumference of the thimble, the constant-pressure mechanism running idle when a load more than a predetermined level is applied on the spindle.

According to the above arrangement, the operation sleeve is rotatable relative to the spindle, and includes the first operation section adjacent to the outer end of the spindle and having a smaller diameter than the diameter of the sleeve and the second operation section fitted to the outer circumference of the thimble. Thus, two-handed control is possible by holding the body with left hand and rotating the first operation section with right hand and one-handed control is also possible by holding the body and rotating the second operation section with one hand. Further, the same operability as in traditional operation can be attained during each measurement.

BRIEF DESCRIPTION OF THE DRAWINGS

FIG. 6 shows the arrangement in the vicinity of the rotor bushing according to the exemplary embodiment.

DETAILED DESCRIPTION OF PREFERRED EMBODIMENT(S)

An exemplary embodiment(s) of the invention will be described below with reference to the attached drawings.

A digital displacement measuring instrument is exemplified by a digital micrometer in this exemplary embodiment, but the invention is not limited thereto.

Arrangement of Digital Micrometer

Figure 1:
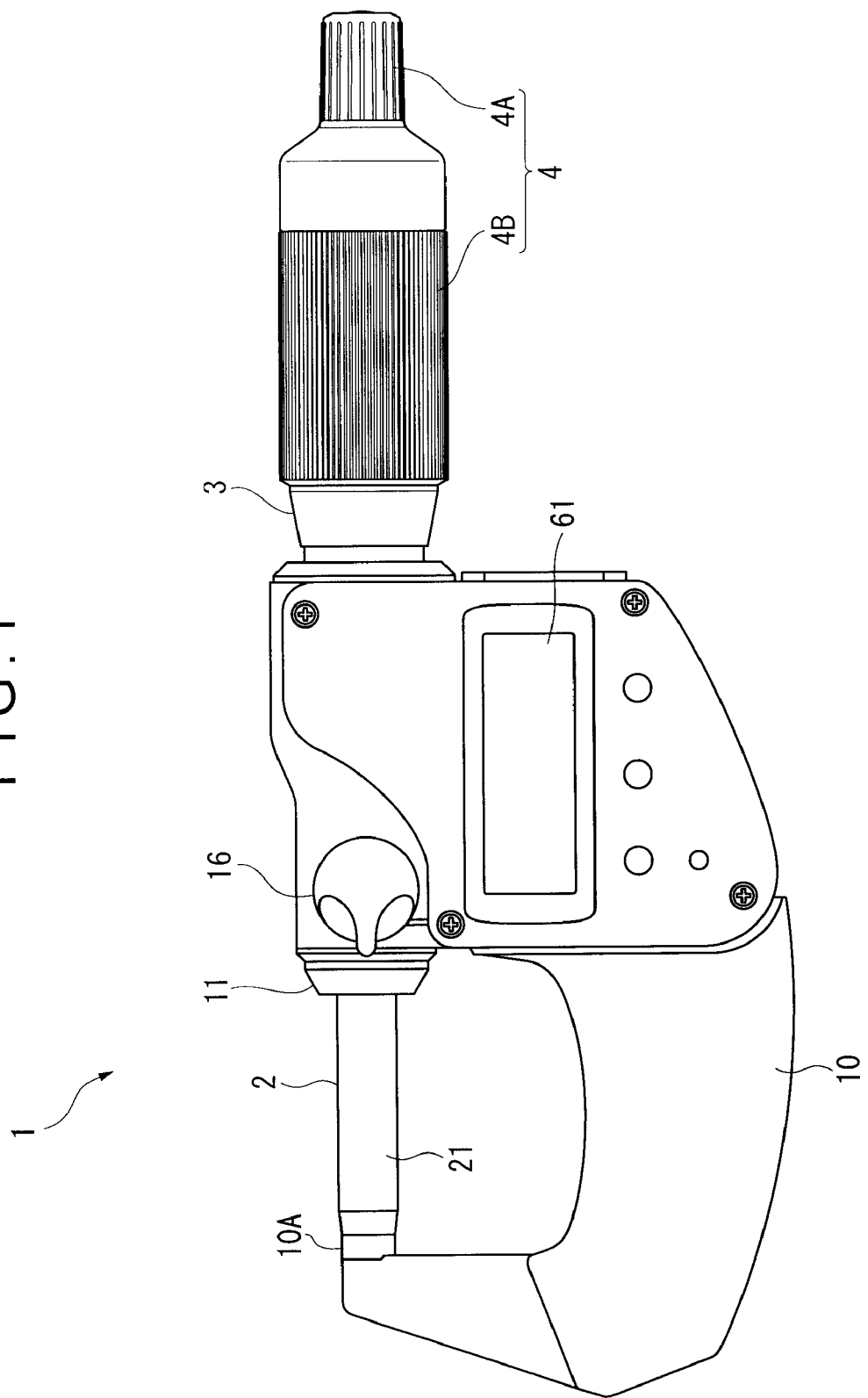
FIG. 1 is a front view showing a digital micrometer according to an exemplary embodiment of the invention.
Figure 2:
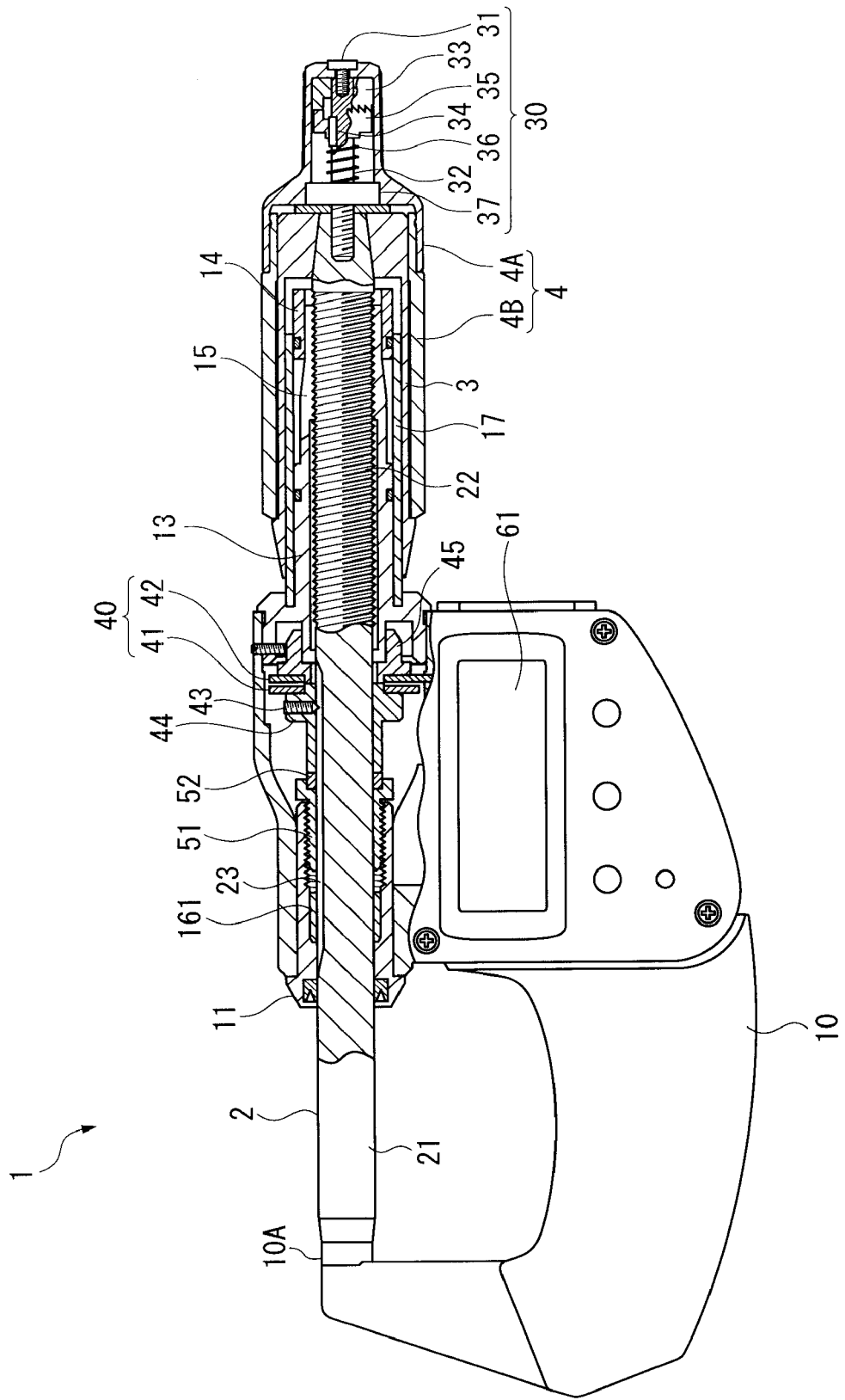
FIG. 2 is a partial cross-sectional view of the exemplary embodiment.

FIG. 1 is a front view of a digital micrometer according to the exemplary embodiment. FIG. 2 is a partial cross-sectional view of the digital micrometer.

As shown in FIGS. 1 and 2, a digital micrometer 1 includes: a substantially U-shaped body 10; a spindle 2 slidably provided on the body 10; an encoder 40 provided inside the body 10 for detecting the displacement of the spindle 2; and a display 61 for displaying the displacement (measured value) of the spindle 2 detected by the encoder 40.

An anvil 10A is fixed to a first end of the body 10, and a bearing cylinder 11 (bushing) for supporting the spindle 2 in a slidable manner is provided on a second end of the body 10. The bearing cylinder 11 is substantially cylindrical. The spindle 2 is inserted into and supported by the inner circumference of the bearing cylinder 11. A clamping collar 161 is axially provided on the inner circumference of the bearing cylinder 11. A clamp screw 16 provided outside the body 10 is manipulated to tighten the spindle 2 by the clamping collar 161, thereby restricting the slide movement of the spindle 2. A substantially cylindrical inner cylinder 13 (spindle support cylinder) is provided on the body 10. A thimble 3 provided on the outer circumference of the inner cylinder 13 is rotated to advance and retract the spindle 2 relative to the anvil 10A.

The spindle 2 includes a spindle body 21 and a screw shaft 22 that are linearly disposed. The spindle 2 also includes a key groove 23 axially provided on the outer circumference of the spindle body 21. The spindle 2 may be provided by a single cylindrical member or, alternatively, by separate members. The key groove 23 is V-shaped in cross section. The inner cylinder 13 provided in the axial direction of the spindle 2 has a first end supported by the body 10 and a second end carved with a female screw on the inner circumference thereof to be engaged with the screw shaft 22 of the spindle 2.

The screw shaft 22 of the spindle 2 includes a screw portion including screws of which leads have 1 mm or more. The leads are preferably in a range of 1.5 mm to 2.54 mm.

A male screw is carved on the outer circumference of the second end of the inner cylinder 13, to which a taper nut 4 is screwed. Three notches are provided on a predetermined section of the inner cylinder 13 at which the male screw is carved to define a three-way split portion 15. The taper nut 14 adjusts the fitting of the spindle 2 and the inner cylinder 13. When the taper nut 14 is rotated to be advanced and retracted in the axial direction of the inner cylinder 13, the tightness applied by the three-way split portion 15 is changed to vary the inner diameter of the inner cylinder 13. As described above, the change in the inner diameter of the inner cylinder 13 allows adjustment of the fitting of the spindle 2 and the inner cylinder 13.

An outer cylinder 17 is fixed to the outer circumference of the inner cylinder 13. The thimble 3 that is cylinder covering the outer circumference of the outer cylinder 17 is connected to an outer end (opposite to the anvil 10A) of the spindle 2 via a support shaft 32 and flange 37.

An operation sleeve 4 is extended from the outer circumference of the thimble 3 to the outer end of the spindle 2. The operation sleeve 4 is rotatable relative to the spindle 2, and includes a first operation section 4A disposed in the vicinity of the outer end of the spindle 2 and having a smaller diameter than the diameter of the outer cylinder 17 and a second operation section 4B fitted into the first operation section 4A and fitted to the outer circumference of the outer cylinder 17.

A constant-pressure mechanism 30 that runs idle when a load more than a predetermined level is applied on the spindle 2 is provided between the first operation section 4A of the operation sleeve 4 and the outer end of the spindle 2. The constant-pressure mechanism 30 may be alternatively provided between the second operation section 4B of the operation sleeve 4 and the outer circumference of the outer cylinder 17.

The constant-pressure mechanism 30 includes: the support shaft 32 having a first end engaged with the outer end of the spindle 2 and a second end that rotatably supports the operation sleeve 4 via a screw 31; a first ratchet wheel 33 fixed to the inner circumference of the first operation section 4A; a second ratchet wheel 35 engaged with the first ratchet wheel 33, the second ratchet wheel 35 being not rotatable and being axially displaceable relative to the support shaft 32 via a key 34; a compression coil spring 36 that biases the second ratchet wheel 35 toward the first ratchet wheel 33; and the flange 37 that supports a first end of the compression coil spring 36 and is fixed to the support shaft 32.

When the operation sleeve 4 is rotated, the first ratchet wheel 33 fixed to the first operation section 4A is integrally rotated. Since the first ratchet wheel 33 is engaged with the second ratchet wheel 35, the second ratchet wheel 35 is also rotated. When the second ratchet wheel 35 is rotated, the support shaft 32 is rotated via the key 34. The spindle 2 screwed with the support shaft 32 and the thimble 3 integrated with the spindle 2 are also rotated with the operation sleeve 4.

While a load more than a predetermined level is applied on the spindle 2, the second ratchet wheel 35 is difficult to rotate. Thus, when the operation sleeve 4 is rotated to rotate the first ratchet wheel 33 at this time, the second ratchet wheel 35 is moved toward the compression coil spring 36 along the key 34 against the compression coil spring 36. In other words, the rotation force of the first ratchet wheel 33 is not transmitted to the second ratchet wheel 35 and therefore the operation sleeve 4 runs idle, thereby keeping constant pressure.

The encoder 40 is an electromagnetic-induction-type encoder, which includes a rotor 41 rotating in the circumferential direction of the spindle 2 and a stator 42 fixed on the body and opposed to the rotor 41 with interposition of a predetermined gap.

The rotor 41 is substantially doughnut-plate shaped and includes an electrode pattern of a coil (not shown) on a first surface adjacent to the stator 42. A second surface of the rotor 41, which is opposite to the stator 42, is engaged with a rotor bushing 44 (rotor holder). Thus, the rotor 41 is supported by the rotor bushing 44. The rotor bushing 44 and rotor 41 may be integrated or, alternatively, may be provided by separate members.

The rotor bushing 44 includes an engaging key 43 engageable with the key groove 23 of the spindle 2. A position adjusting screw 51 for restraining the rotor bushing 44 from moving in the direction opposite to the stator 42 axially along the spindle 2 is provided opposite to the stator 42 across the rotor bushing 44. An orientation maintaining unit 52 for maintaining an orientation of the rotor bushing 44 to be substantially orthogonal to the axis of the spindle 2 is provided between the rotor bushing 44 and the position adjusting screw 51.

The position adjusting screw 51 covers the outer circumference of the spindle 2 opposite to the stator 42 across the rotor bushing 44 while being screwed to the inner circumference of the bearing cylinder 11 to be displaceable in the axial direction of the spindle 2.

The stator 42 includes a substantially doughnut-plate shaped stator ring provided on the outer circumference of the spindle 2 and a plate shaped stator extension provided on the outer circumference of the stator ring to be stretched toward the inside of the body 10. The stator ring has an electrode pattern formed by a transmission coil and receive coil for detecting a rotation angle of the rotor 41 by electromagnetically connecting to the electrode pattern of the rotor 41.

Figure 3:
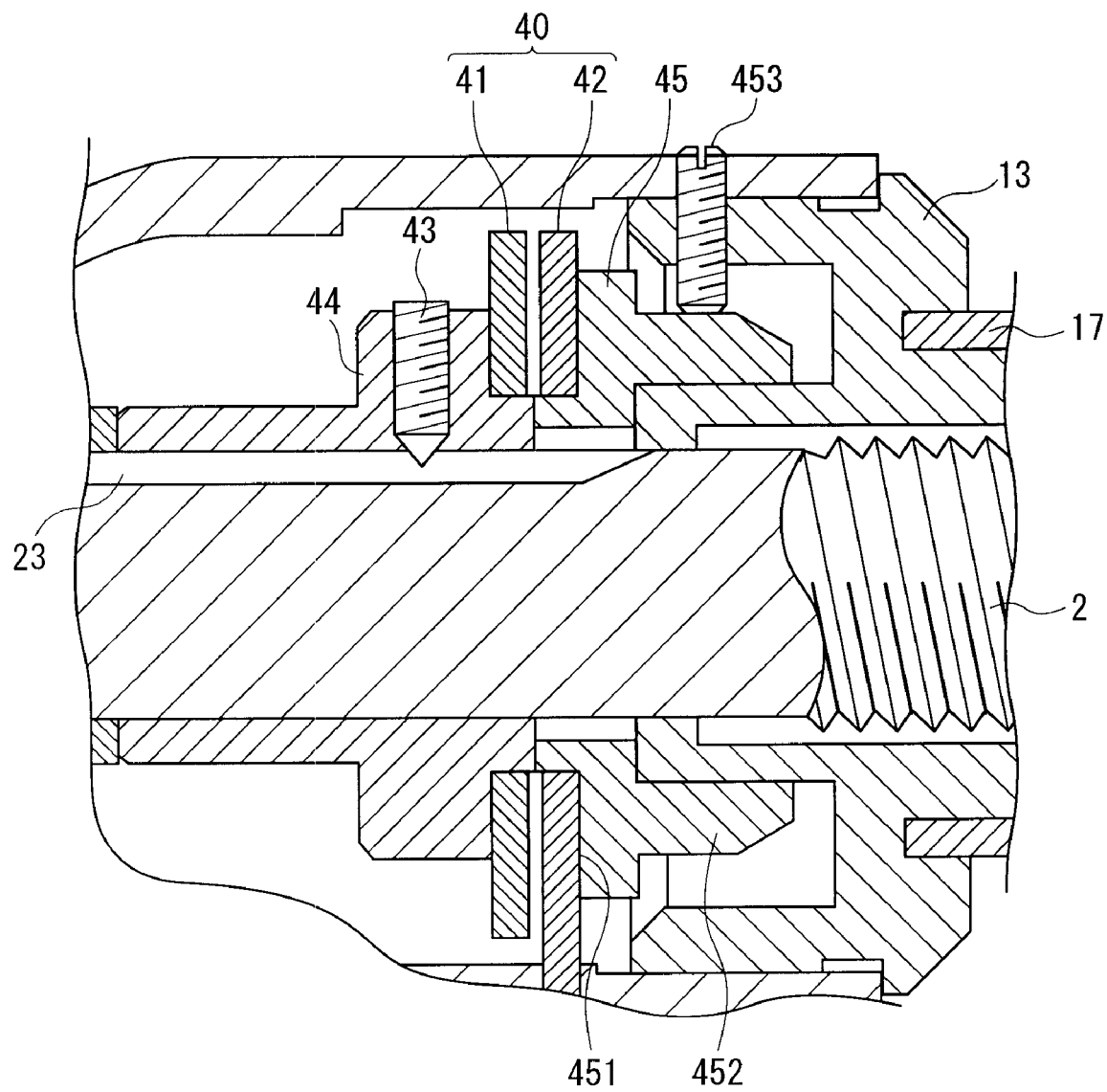
FIG. 3 is an enlarged cross-sectional view showing the vicinity of a rotor bushing according to the exemplary embodiment.

As shown in FIG. 3, a surface of the stator ring, which is opposite to the rotor 41, is held by the stator bushing 45 (stator holder). The stator bushing 45 has a stator holding portion 451 for holding the stator 42 on a first end, and a fitted portion 452 to be fitted to the outer circumference of the inner end of the inner cylinder 13 on a second end. After the fitted portion 452 is fitted to the outer circumference of the inner end of the inner cylinder 13, a setscrew 453 screwed from the outside of the body 10 is pressed against the fitted portion 452, thereby fixing the stator bushing 45 to the inner cylinder 13 (i.e., the body 10). In other words, the stator 42 is fixed to the inner cylinder 13 (i.e., the body 10) via the stator bushing 45 in the vicinity of the spindle 2 so as not to be displaceable in the axial direction of the spindle 2.

The stator extension is fixed to the body 10 internally in the body 10.

Figure 4:
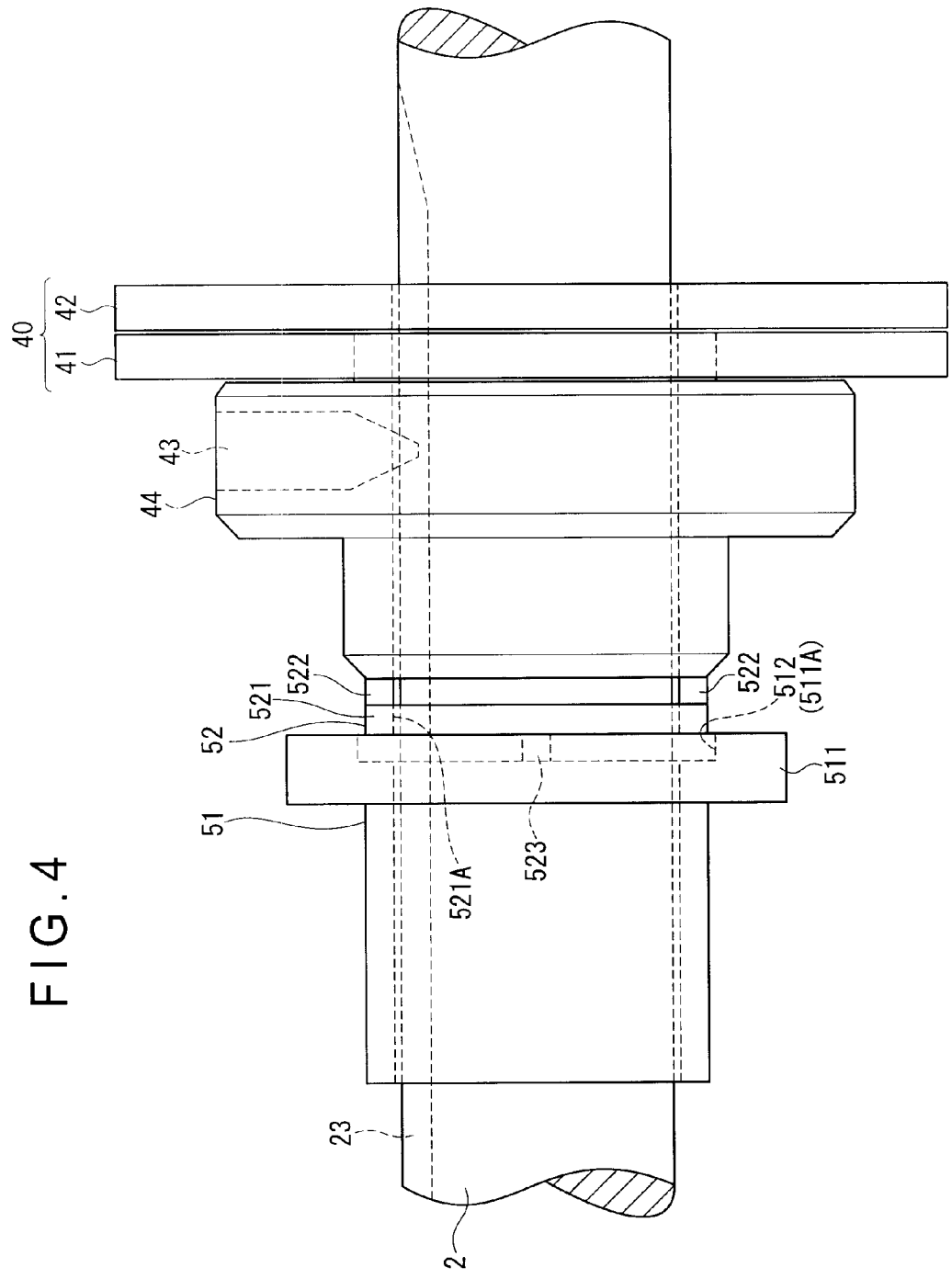
FIG. 4 shows an arrangement in the vicinity of the rotor bushing according to the exemplary embodiment.
Figure 5:
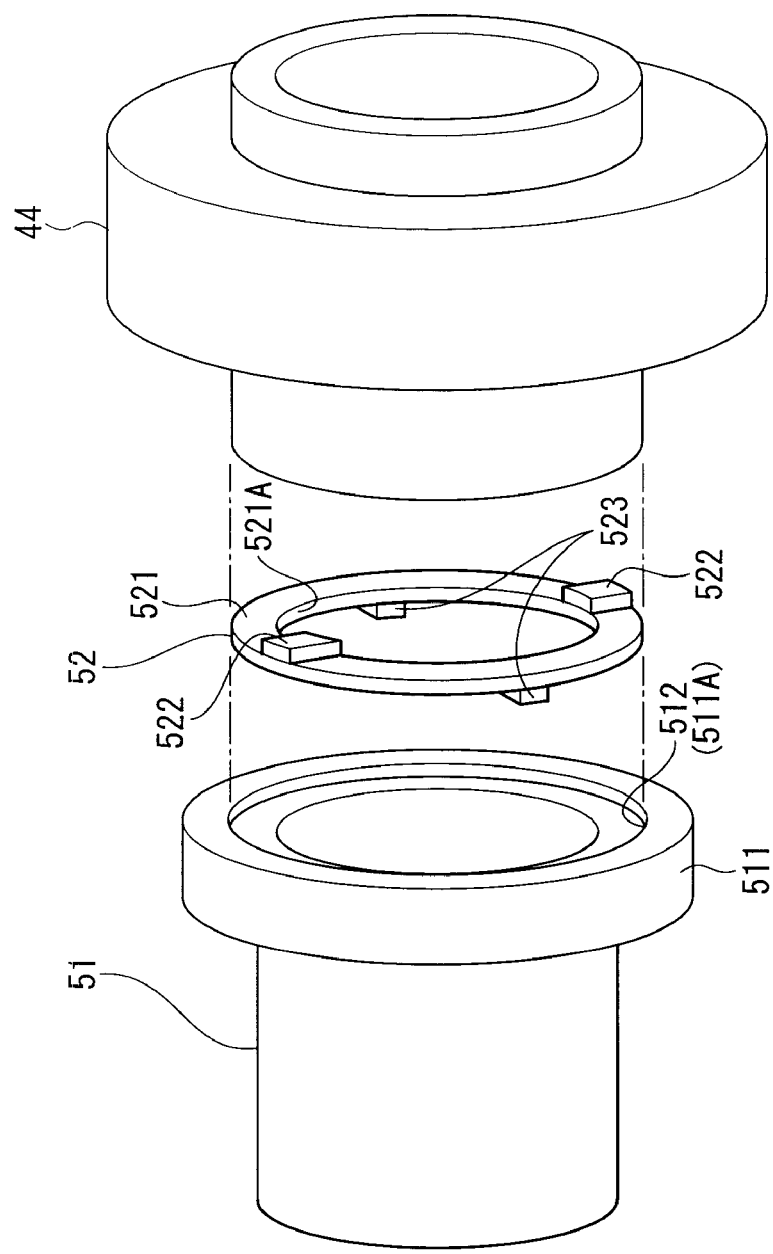
FIG. 5 is an exploded view showing the rotor bushing according to the exemplary embodiment.

FIG. 4 shows a detailed arrangement in the vicinity of the rotor bushing of the digital micrometer according to the exemplary embodiment, and FIG. 5 is an exploded view of the orientation maintaining unit 52.

As shown in FIGS. 4 and 5, the orientation maintaining unit 52 is provided between the rotor bushing 44 and position adjusting screw 51 to contact both the rotor bushing 44 and position adjusting screw 51, thereby maintaining the orientation of the rotor bushing 44 to be substantially orthogonal to the axis of the spindle 2. The orientation maintaining unit 52 includes: a substantially disk-shaped board 521; a substantially circular hole 521A provided in the board 521 and penetrated by the spindle 2; two first abutment portions 523 provided on a first surface of the board 521 to contact the position adjusting screw 51; two second abutment portions 522 provided on a second surface of the board 521 to contact the rotor bushing 44.

The two first abutment portions 523 are substantially rectangular-parallelepiped protrusions provided to be symmetric about the axis of the spindle 2. Similarly, the two second abutment portions 522 are substantially rectangular-parallelepiped protrusions provided to be symmetric about the axis of the spindle 2.

The two first abutment portions 523 and two second abutment portions 522 are disposed so that a line connecting the two first abutment portions 523 is substantially perpendicular to a line connecting the two second abutment portions 522.

The position adjusting screw 51 is substantially cylindrical and is fixed to the body 10 to cover the spindle 2. The position adjusting screw 51 includes: a flange 511 radially extending and provided on an end adjacent to the rotor bushing 44; and a movement restricting portion 512 (board restricting portion) for restricting the movement of the orientation maintaining unit 52 in the direction perpendicular to the axis of the spindle 2. The movement restriction portion 512 is provided on an end surface of the flange 511 adjacent to the rotor bushing 44 and is provided by a recess 511A that can accommodate the orientation maintaining unit 52.

FIG. 6 shows a detailed arrangement in the vicinity of the rotor bushing when the position adjusting screw 51 is fixed to be inclined to the spindle 2.

Since the digital micrometer 1 of the exemplary embodiment includes the orientation maintaining unit 52, even when the position adjusting screw 51 is fixed to be inclined to the spindle 2 as, shown in FIG. 6, the two first abutment portions 523 contact the position adjusting screw 51 at their upper ends to eliminate the influence of the inclination of the position adjusting screw 51. Thus, an appropriate orientation of the rotor bushing 44 can be maintained.

In FIG. 6, the position adjusting screw 51 is fixed to be vertically inclined to the spindle 2. However, even when the position adjusting screw 51 is alternatively fixed to be inclined to the spindle 2 in the direction orthogonal to the paper surface of FIG. 6, the two second abutment portions 522 contact the rotor bushing 44 at their ends to eliminate the influence of the inclination of the position adjusting screw 51, so that an appropriate orientation of the rotor bushing 44 can be also maintained.

Usage of Digital Micrometer

The thimble 3 is rotated to advance and retract the spindle 2 relative to the anvil 10A to bring an end of the spindle 2 and the anvil 10A into contact with a target portion of an object to be measured. At this time, the rotation of the spindle 2 is transmitted to the rotor 41 through the key grove 23, engaging key 43 and rotor bushing 44. The rotation angle of the rotor 41 detected by the encoder 40 is converted into the axial displacement of the spindle 2 to be displayed on the display 61.

Advantages of Exemplary Embodiment

In the digital micrometer 1, the stator 42 is fixed to the inner cylinder 13 via the stator bushing 45 in the vicinity of the spindle 2 so as not to be displaceable in the axial direction of the spindle 2 even when the rotor bushing 44 and rotor 41 are rotated synchronically with the spindle 2. Thus, measurement errors due to the movement of the stator 42 can be avoided as much as possible. Even when the encoder 40 has high resolution for enhancing accuracy and efficiency, the axial movement of the stator 42 is not detected by the encoder 40 having high accuracy, thus providing a digital displacement measuring instrument having high accuracy and efficiency.

Since the lead of the screw portion of the spindle 2 is 1 mm or more, operability can be enhanced as compared to, for example, a traditional digital micrometer having a lead of 0.5 mm. In other words, the efficiency can be enhanced.

Further, the stator bushing 45 includes the stator holding portion 451 for holding the stator 42 on the first end and the fitted portion 452 to be fitted to the outer circumference of the inner cylinder 13 that rotatably supports the outer circumference of the spindle 2 on the second end. Accordingly, simply by fitting the fitted portion 452 to the outer circumference of the inner cylinder 13 and fixing the fitted portion 452 to the inner cylinder 13 via the setscrew 453 or the like, the stator 42 can be fixed to the inner cylinder 13 (i.e., the body 10) to be accurately centered on the spindle 2. Thus, the digital micrometer 1 can be easily assembled while maintaining high accuracy.

Furthermore, since the orientation maintaining unit 52 is provided between the rotor bushing 44 and position adjusting screw 51 to contact both the rotor bushing 44 and position adjusting screw 51, the orientation maintaining unit 52 maintains the orientation of the rotor bushing 44 to be substantially orthogonal to the axis of the spindle 2 by contacting both the rotor bushing 44 and position adjusting screw 51. Thus, the movement of the rotor 41 (rotor bushing 44) during its rotation can be absorbed, thereby retaining high accuracy.

Even when the position adjusting screw 51 is inclined to the spindle 2, the rotor bushing 44 is not inclined to the spindle 2 and therefore an appropriate orientation of the rotor bushing 44 can be maintained. Thus, the depth of the engaging key 43 relative to the key groove 23 is hardly varied by the rotation of the spindle 2, thereby reducing rotational transmission errors.

The two first abutment portions 523 of the orientation maintaining unit 52 are symmetric about the axis of the spindle 2. Similarly, the two second abutment portions 522 are symmetric about the axis of the spindle 2. Further, the line connecting the two first abutment portions 523 is substantially perpendicular to the line connecting the two second abutment portions 522. Thus, the orientation of the rotor bushing 44 can be maintained to be substantially orthogonal to the axis of the spindle 2.

The orientation maintaining unit 52 is a component having a simple shape, which includes: the substantially disk-shaped board 521; the hole 521A provided on the board 521 and penetrated by the spindle 2; the first abutment portions 523 that are two protrusions provided on the first surface of the board 521; the two second abutment portions 522 that are two protrusions provided on the second surface of the board 521. Thus, the orientation maintaining unit 52 can be manufactured at low cost from metals, resins or the like, thereby reducing cost for adding the orientation maintaining unit 52 to a traditional digital micrometer.

Since the movement restraining portion 512 provided on the position adjusting screw 51 restrains the orientation maintaining unit 52 from moving in the direction perpendicular to the axis of the spindle 2, the movable range of the orientation maintaining unit 52 can be limited.

Accordingly, the orientation maintaining unit 52 does not contact the spindle 2 and thus does not prevent smooth rotation of the spindle 2.

Since the orientation adjusting screw 51 is used also in a traditional digital micrometer, the movement of the orientation maintaining unit 52 in the direction perpendicular to the axis of the spindle 2 can be easily restricted only by adding the recess 511A capable of accommodating the orientation maintaining unit 52 on the end surface of the orientation adjusting screw 51 adjacent to the rotor bushing 44 provided in a traditional digital micrometer.

Further, the operation sleeve 4 is rotatable relative to the spindle 2, and includes the first operation section 4A disposed on the outer end of the spindle 2 and having a smaller diameter than the diameter of the outer cylinder 17 and the second operation section 4B fitted to the outer circumference of the thimble 3. Thus, two-handed control is possible by holding the body 10 with the left hand and rotating the first operation section 4A with the right hand, and one-handed control is also possible by holding the body 10 and rotating the second operation section 4B with one hand. The same operability as in traditional operation can be attained during each measurement.

Modification of Exemplary Embodiment

The invention is not limited to the exemplary embodiment, but includes modifications and improvements as long as an object of the invention can be achieved.

The shape and the like of the orientation maintaining unit 52 are not limited to those described in the exemplary embodiment.

The shape of the two first abutment portions 523 and two second abutment portions 522 is not limited to a substantially rectangular parallelepiped shape as exemplarily described in the exemplary embodiment, but may be a spherical shape, pillar shape, pyramidal or conical shape, or other shape.

Further, it is only required that the board 521 of the orientation maintaining unit 52 includes the hole 521A to be penetrated by the spindle 2. The shape of the board 521 is not limited to a disk shape as exemplarily described in the exemplary embodiment. For example, the board 521 may have a polygonal plate shape or other shape, and may be thick in the axial direction of the spindle 2.

Similarly, it is only required that the hole 521A has a shape capable of being penetrated by the spindle 2. The shape of the hole 521A is not limited to a substantially circular shape as exemplarily described in the exemplary embodiment. For example, the hole 521A may have a polygonal shape or other shape.

The same advantages can be attained as in the exemplary embodiment when the above-described arrangements are alternatively employed.

The movement restricting portion 512 is not limited to the layout, shape and the like described in the exemplary embodiment.

The movement restricting portion 512 is exemplarily provided on the flange 511 of the position adjusting screw 51 in the exemplary embodiment, but is not limited thereto. For example, the movement restricting portion 512 may be provided on the rotor bushing 44. At this time, the same advantages can be also attained as in the exemplary embodiment.

The engaging key 43 provided on the rotor bushing 44 is single while the key groove 23 provided on the spindle 2 is single in the exemplary embodiment, but other arrangement is possible. For example, a plurality of engaging keys 43 may be provided on the rotor bushing 44 and, corresponding thereto, a plurality of key grooves 23 may be axially provided on the outer circumference of the spindle 2. In the above arrangement, the plurality of engaging keys 43 are slidably engaged on the spindle 2, so that the rotor 41 can be more securely positioned on the spindle 2 and thus shaky movement is not generated between the spindle 2 and the rotor 41.

The digital displacement measuring instrument is exemplified by the digital micrometer 1 in the exemplary embodiment, but is not limited thereto. For example, the digital displacement measuring instrument may be a digital micrometer head or the like, which includes the spindle 2 slidably provided on the body 10 and the encoder 40 for detecting the displacement of the spindle 2.

Further, the encoder 40 is not limited to the electromagnetic-induction-type encoder exemplarily described in the exemplary embodiment. It is only required that the encoder 40 is a digital encoder capable of detecting the relative rotation of the rotor 41 relative to the stator 42. For example, the encoder may be a optical linear encoder, electrostatic encoder or the like.

What is claimed is:

1. A digital displacement measuring instrument, comprising:
   a body;
   a spindle screwed into the body to be axially advanced and retracted; and
   an encoder that detects a displacement of the spindle, wherein
   the encoder comprises a rotor rotating in a circumferential direction of the spindle and a stator disposed opposite to the rotor with an interposition of a predetermined gap and provided on the body,
   the rotor is supported by a rotor holder fitted to an outer circumference of the spindle to be displaceable in an axial direction of the spindle, the rotor being disposed opposite to the stator with the interposition of the predetermined gap,
   the rotor holder includes an engaging key engageable with a key groove axially provided on the outer circumference of the spindle and is displaceable in the axial direction of the spindle by a position adjusting screw,
   the position adjusting screw covers the outer circumference of the spindle opposite to the stator across the rotor holder and is screwed into the body to be displaceable in the axial direction of the spindle, and the stator is fixed to the body via a stator holder in a vicinity of the spindle so as not to be displaceable in the axial direction of the spindle.

2. The digital displacement measuring instrument according to claim 1, wherein a screw portion of the spindle screwed into the body has a lead of 1 mm or more.

3. The digital displacement measuring instrument according to claim 1, wherein the stator holder includes a stator holding portion that holds the stator on a first end and a fitted portion on a second end, the fitted portion being fitted to an outer circumference of a spindle support cylinder that is provided on the body and rotatably supports the outer circumference of the spindle, and the fitted portion is fixed to the spindle support cylinder.

4. The digital displacement measuring instrument according to claim 1, wherein an orientation maintaining unit is provided between the rotor holder and the position adjusting screw to contact both the rotor holder and the position adjusting screw to maintain an orientation of the rotor holder to be substantially orthogonal to an axis of the spindle.

5. The digital displacement measuring instrument according to claim 4, wherein the orientation maintaining unit includes: a board provided on the outer circumference of the spindle; two first abutment portions provided on a first end surface of the board to contact the position adjusting screw; and two second abutment portions provided on a second end surface of the board to contact the rotor holder, the first abutment portions are symmetric about the axis of the spindle, the second abutment portions are symmetric about the axis of the spindle, and a line connecting the two first abutment portions is substantially perpendicular to a line connecting the two second abutment portions.

6. The digital displacement measuring instrument according to claim 1, wherein the position adjusting screw includes a board restricting portion to restrict the board from moving in a direction perpendicular to the axis of the spindle, and the board restricting portion is provided on an end surface of the position adjusting screw adjacent to the rotor holder and includes a recess to accommodate the board.

7. The digital displacement measuring instrument according to claim 1, wherein the spindle is screwed into the body via a sleeve, a thimble fitted to an outer circumference of the sleeve is fixed to the spindle, and the digital displacement measuring instrument further comprising: an operation sleeve rotatable relative to the spindle and including a first operation section that is provided to an outer end of the spindle and has a smaller diameter than a diameter of the sleeve and a second operation section that is fitted to an outer circumference of the thimble; and a constant-pressure mechanism provided either between the first operation section of the operation sleeve and the outer end of the spindle or between the second operation section of the operation sleeve and the outer circumference of the thimble, the constant-pressure mechanism running idle when a load more than a predetermined level is applied on the spindle.

\* \* \* \* \*